United States Patent
Kalsi

(10) Patent No.: US 6,330,838 B1
(45) Date of Patent: Dec. 18, 2001

(54) PEDAL ASSEMBLY WITH NON-CONTACT PEDAL POSITION SENSOR FOR GENERATING A CONTROL SIGNAL

(75) Inventor: Avtar Kalsi, Windsor (CA)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

(21) Appl. No.: 09/569,003

(22) Filed: May 11, 2000

(51) Int. Cl.$^7$ ................... G05G 1/14; H02G 3/00
(52) U.S. Cl. ................ 74/514; 74/512; 74/560; 74/513; 307/10.1; 200/61.89
(58) Field of Search .............. 74/512, 513, 514, 74/560; 123/198 DB; 307/10.1; 200/86.5, 61.89; 180/271

(56) References Cited

U.S. PATENT DOCUMENTS

| | | | |
|---|---|---|---|
| 3,757,758 | * 9/1973 | Stoltman | 123/198 DB |
| 4,733,214 | * 3/1988 | Andresen | 338/128 |
| 4,965,417 | * 10/1990 | Massie | 200/86.5 |
| 5,013,930 | * 5/1991 | Spakowski et al. | 307/10.1 |
| 5,439,275 | 8/1995 | Padula et al. . | |
| 5,697,260 | 12/1997 | Rixon et al. . | |
| 5,768,946 | 6/1998 | Fromer et al. . | |
| 5,797,467 | * 8/1998 | Watanabe | 180/271 |
| 5,819,593 | 10/1998 | Rixon et al. . | |
| 6,134,987 | * 10/2000 | Kalsi | 74/560 |

FOREIGN PATENT DOCUMENTS 63-151562 * 6/1988 (JP) ................................ 74/512

* cited by examiner

Primary Examiner—Vinh T. Luong
(74) Attorney, Agent, or Firm—Howard & Howard

(57) ABSTRACT

A pedal assembly (10) is mounted on a body structure of a motor vehicle and is used to generate a control signal for vehicle system. The pedal assembly includes a pedal arm (12) having a lower end (14) connected to a pedal pad (16) and an upper end (18) pivotally supported on a pivot shaft (22) to define a pivot axis (24). A housing (20) supports the pivot shaft (22) such that the pedal arm (12) is mounted for movement relative to the housing (20) about the pivot axis (24). A non-contact sensor assembly with a magnet member (26) spaced apart from a non-contact sensing surface (30) is used to generate the control signal based on pedal movement. The magnet member (26) is pivotally mounted on the shaft (22) for pivotal movement with the pedal arm (12) about the pivot axis (24) and the non-contact sensing surface (30) extends across an interior face (28) of the housing (20) to interact with the magnet member (26). Rotational movement of the magnet member (26) is converted to a linear output control signal via the non-contact sensing surface (30). A resilient member (50) is mounted within a curved pocket (54) of the housing (20). A first end (58) of the resilient member (50) is fixed to the housing (20) and a second end (62) is engageable by a camming portion (60) on the upper end (48) of the pedal arm (12) to create a hysteresis effect when the pedal arm (12) is moved from a rest position to an applied position. A cover (64) is attached to the housing (20) to enclose the sensor assembly within the housing (20) to provide a sealed environment for the magnet member (26) and the non-contact sensing surface (30).

11 Claims, 4 Drawing Sheets

US 6,330,838 B1

PEDAL ASSEMBLY WITH NON-CONTACT PEDAL POSITION SENSOR FOR GENERATING A CONTROL SIGNAL

TECHNICAL FIELD

The subject invention relates to a pedal assembly with a sensor that generates an electric signal for controlling a vehicle system. Specifically, the pedal assembly includes an arcuate magnet member that rotates with pivotal pedal movement and interacts with a non-contact sensing surface to generate a linear output signal varying with pedal deflection.

BACKGROUND OF THE INVENTION

Pedal assemblies are used to control movement of a vehicle. Typically pedal assemblies include mechanical connections to the respective vehicle system that the pedal controls. For example, a mechanical connection for an accelerator pedal usually includes a bracket and cable-connect to an engine throttle. The rotary movement of the pedal is transferred to the engine throttle via the cable. The cable controls the position of the engine throttle based on the position of the pedal. Similar mechanical connections are used for brake and clutch pedals.

These pedal assemblies have a desirable feel experience by the operator due to hysteresis feedback provided by the mechanical linkage interconnecting the accelerator pedal and the fuel throttle. With a mechanical linkage, the pedal pressure required when advancing the accelerator pedal is greater than that required to maintain a fixed position. This difference is often referred to as the hysteresis effect. This effect is importance for reducing operator fatigue.

As vehicles incorporate more electrically control vehicle systems, attempts have been made to provide an electrical link between the pedal and the vehicle system to be controlled. Mechanical connections are often bulky and difficult to package within the limited space available in the vehicle. The components in the mechanical linkages are also subject to wear and can bind or stick causing the vehicle system to become inoperable. The electrical link eliminates the need for mechanical linkage parts and thus, reduces cost and increases packaging space for other vehicle components.

Some pedals incorporating electric control utilize contact sensors such as potentiometers to generate the control signal as the pedal pivots between various operational positions. One disadvantage with the use of contact sensors is that they tend to wear over time, which can affect the accuracy of the control signal.

An example of a pedal incorporating a contact sensor electric control is shown in U.S. Pat. Nos. 5,697,260 and 5,819,593. The pedal assemblies include a pedal arm that is pivotally mounted within a housing that is supported by a vehicle structure. The pedal arm pivots with respect to the housing as a force is applied to a pedal connected to one end of the pedal arm. The pedal assemblies include a separate sensor assembly, such as a potentiometer, that is installed within the housing. The sensor assembly generates an electric signal that varies in proportion to the movement of the pedal arm with respect to the housing.

Another example of a pedal with a contact sensor electric control is shown in U.S. Pat. No. 5,768,946. A separate sensor module is installed within the housing. The sensor module includes a electrical connector for connection to the vehicle system to be controlled. As discussed above, the sensor module is used to sense the position of the pedal and generates an electric signal that varies as the pivotal pedal position varies. Typically, these sensor modules are potentiometers. The potentiometers are sensitive to dirt and other contaminants and thus must be provided in a sealed environment in order to operate properly. The sensor modules are thus, self-contained and are installed into the pedal housing as a sealed component. The sensor modules are expensive and bulky. The pedal housing must be specially designed to accommodate these large sensor modules, which is undesirable.

Sometimes non-contact sensors such as Hall effect sensors are used to generate the control signal. An example of a pedal incorporating a non-contact type sensor for electric control is shown in U.S. Pat. No. 5,439,275. The pedal assembly includes a Hall Effect sensor used in combination with magnets mounted within a plunger to generate an output signal that varies according to pedal position. As the pedal is pivoted, the plunger moves in a linear direction with respect to the sensor resulting in a varying magnetic field. In such a configuration it is difficult to convert rotational pedal input movement into an accurate linear output from the sensor, which can be used to control the vehicle system.

Thus, it would be desirable to have an improved pedal assembly with a non-contact sensor that can use rotational pedal input to produce a linear output that corresponds to pedal deflection so that an accurate control signal can be used to control the corresponding vehicle system. It would be also desirable to have a more compact pedal assembly with integrated non-contact sensing components that do not require a separate sensor housing while still providing a sealed environment to keep out dirt and other components. The pedal assembly with integrated non-contact sensing components should also include a resistance assembly for generating a hysteresis effect that is sealed within the same housing. This would improve packaging and reduce cost and assembly time for the pedal.

SUMMARY OF THE INVENTION AND ADVANTAGES

A pedal assembly is adapted to be mounted on a body structure of a motor vehicle and is operative to generate a control signal for vehicle system. The assembly includes a housing and a pedal arm supported for movement relative to the housing. The pedal arm has a first end connected to a pedal pad and a second end pivotally supported on a shaft to define a pivot axis. A magnet member is pivotally mounted on the shaft for pivotal movement with the pedal arm about the pivot axis. The assembly is characterized by the housing presenting a non-contact sensing surface for interacting with the magnet member to generate an electric control signal that varies in magnitude by the extent of angular rotation of the magnet member relative to the non-contact sensing surface. Preferably, the sensing surface is a non-contact sensor that is mounted within the housing such that the sensor and housing are formed as one piece.

The non-contact sensor measures a varying magnetic field generated by the magnet member as the pedal arm pivots between operational positions and generates a linear output voltage proportional to pedal deflection. In the preferred embodiment, the magnet member has an arcuate body portion defined by a predetermined arc length, a circular body portion having a bore for receiving said shaft, and a radially extending arm portion interconnecting said circular body portion and said arcuate body portion. The non-contact sensor is positioned adjacent to the magnet member to define a gap having a predetermined width. The non-contact sensor remains fixed relative to the magnet member such that at least a minimum gap width between the magnet member and the sensing surface is maintained at all pedal operational positions.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
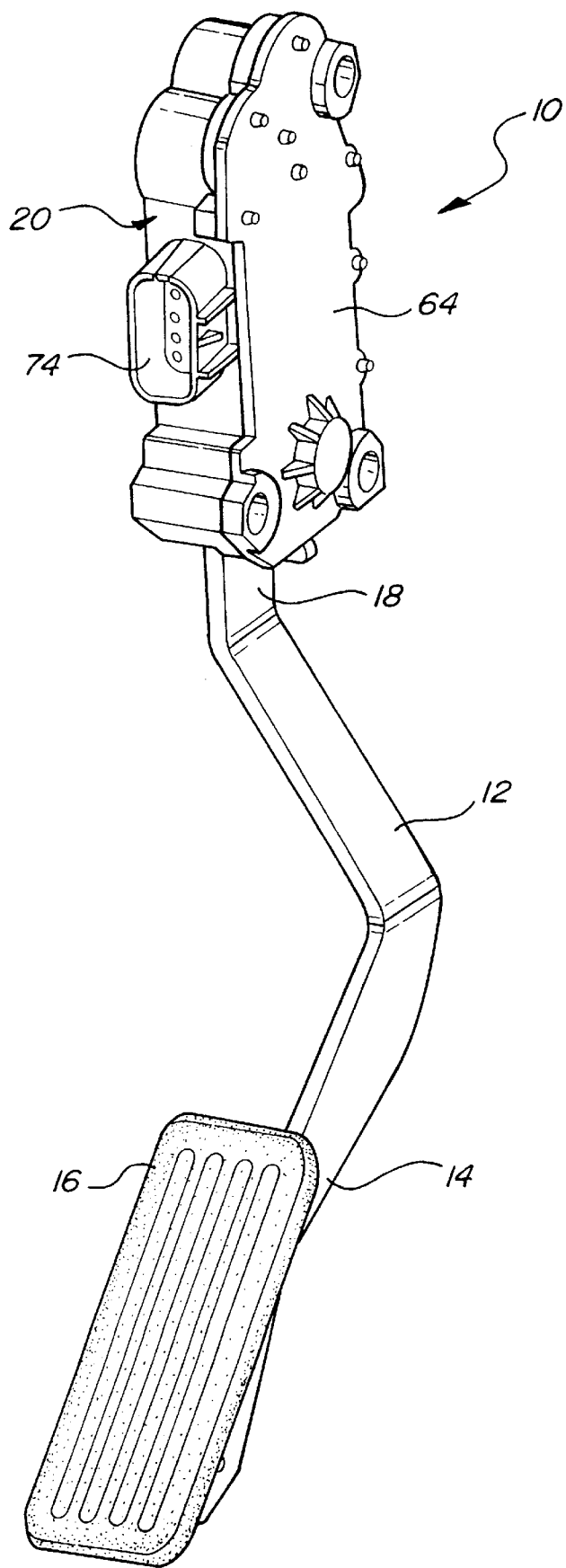
FIG. 1 is a perspective view of the pedal assembly.

Referring to the Figures, wherein like numerals indicate like or corresponding parts throughout the several views, a pedal assembly is shown generally at 10 in FIG. 1. The pedal assembly 10 includes a pedal arm 12 with a lower end 14 operatively connected to a pedal pad 16 and an upper end 18 pivotally mounted within a housing 20. The pedal assembly 10 generates an electric control signal that is used to control a vehicle system function such as a throttle position. The electric control signal varies in magnitude as a force is applied to the pedal pad 16 to move the pedal arm from a rest position to an applied position.

Figure 2:
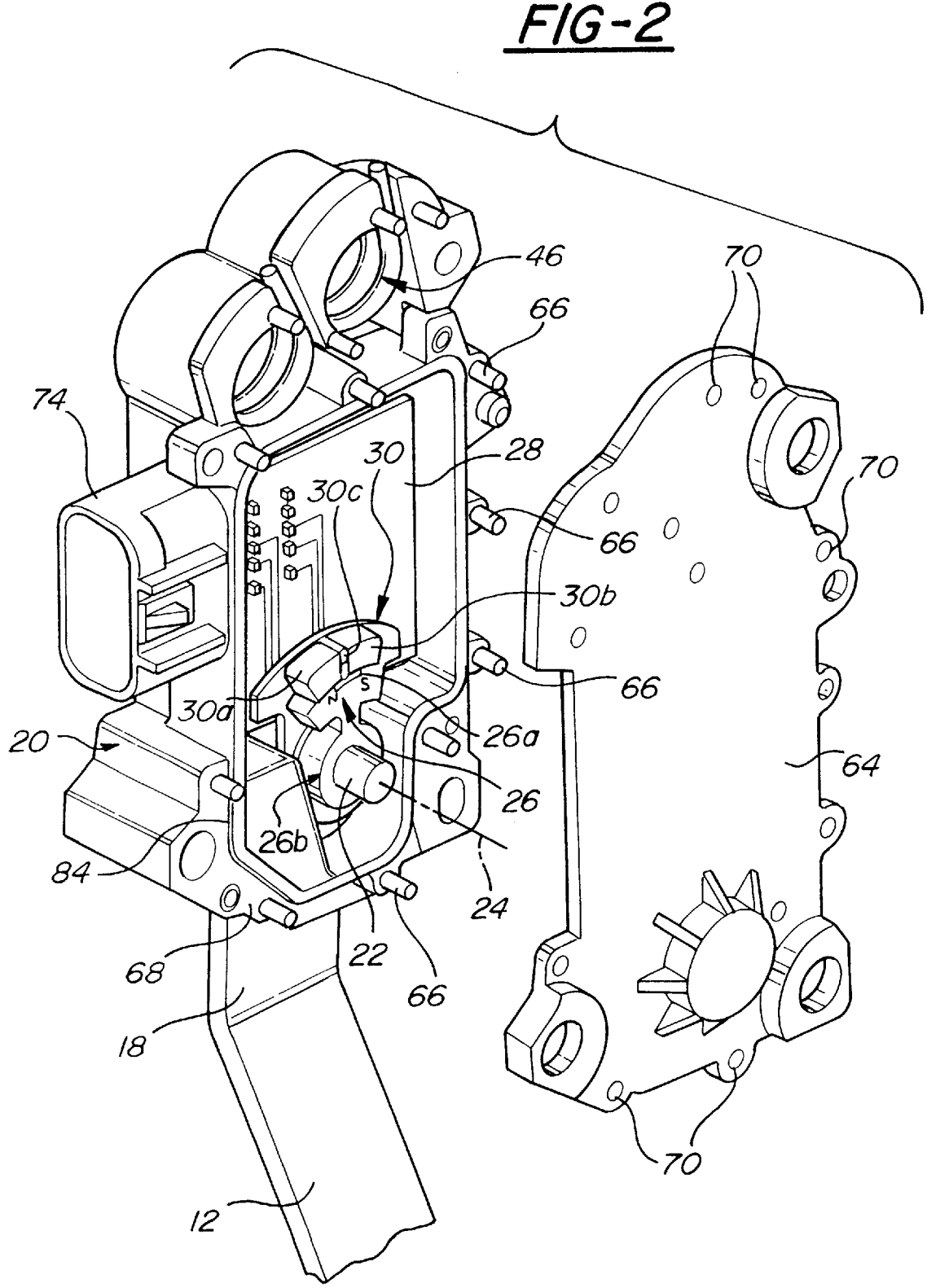
FIG. 2 is an exploded view, partially broken away, of the pedal assembly shown in FIG. 1.

As shown in FIG. 2, the pedal arm 12 is supported for movement relative to the housing 20 on a pivot shaft 22 that defines a pivot axis 24. The pedal arm 12 is preferably formed from a steel or plastic material. A sensor assembly is also mounted within the housing 20. The sensor assembly includes a magnet member 26 that is pivotally mounted on the shaft 22 for pivotal movement with the pedal arm 12 about the pivot axis 24. Preferably, the magnet member 26 is fixed directly to the shaft 22 for rotation therewith.

The housing 20 includes an interior face 28 that presents a non-contact sensing surface 30 for interacting with the magnet member 26 to generate an electric control signal that vales in magnitude by the extent of angular rotation of said magnet member 26 relative to said non-contact sensing surface 30. Preferably the non-contact sensing surface 30 is a separate component non-contact sensor that is attached by means well known in the art to the interior face 28 of the housing 20, such that the non-contact sensor 30 and interior face 28 are formed as one piece. The operation of the magnet 26 and non-contact sensor 30 will be discussed in greater detail below.

Figure 3:
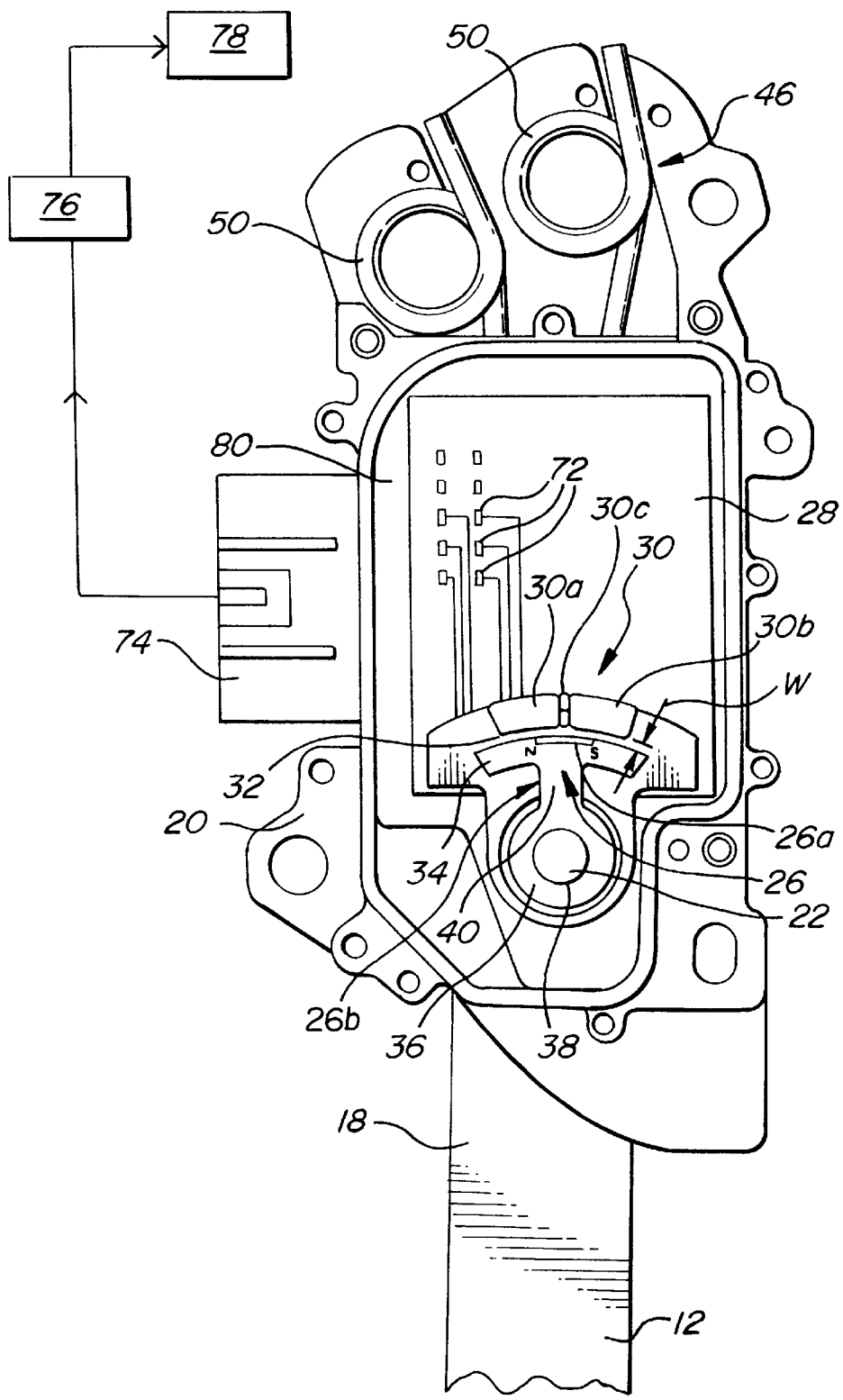
FIG. 3 is a side view, partially broken away, with the cover removed of the of the pedal assembly shown in FIG. 1 and showing one embodiment of the sensor member and sensing surface.
Figure 5:
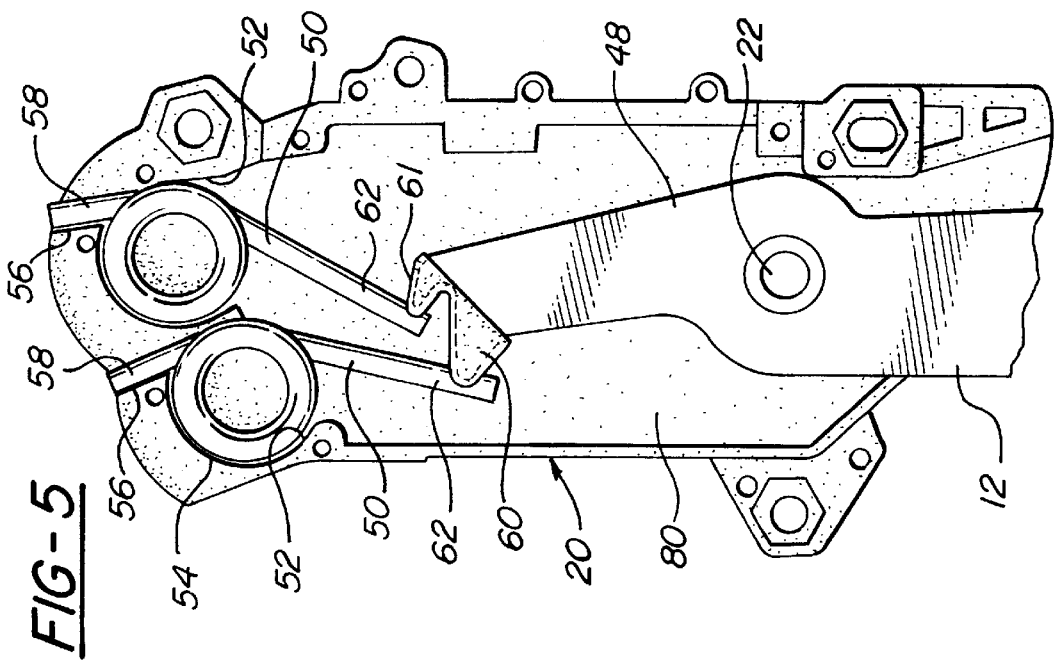
FIG. 5 is a side view, partially broken away, with the cover and dividing portion removed and showing the resistance assembly when the pedal arm is in the applied position.

In the preferred embodiment, the magnet member 26 has a magnetic portion 26a that is positioned adjacent to the non-contact sensor 30 to define a gap 32, shown more clearly in FIG. 3, having a predetermined width W. Preferably, the width W is only a few millimeters, however other widths could be used. The non-contact sensing surface 30 remains fixed relative to the magnet member 26 such that at least a minimum gap width between the magnet member 26 and the sensing surface 30 is maintained at all pedal operational positions.

Preferably, the magnet member 26 is a permanent magnet having a two (2) pole south/north design (i.e., one negative (−) pole and one positive (+) pole). However, multiple poles (i.e., more than two (2) poles), alternating between positive (+) and negative (−) orientations, i.e., north and south orientations, could also be used. The permanent magnet 26 has an arcuate shape with the positive (+) and negative (−) poles each having a predetermined width. The width of the poles controls the linearity of the output control signal.

Variable pole width manipulation is used to increase linearity between the poles on a multi-pole magnet 26 for sensing a linear magnetic field during angular rotation of the field as the pedal arm 12 pivots. One of the benefits of this configuration is that there is a linear relationship between the output signal and pedal deflection. The use of multiple poles creates magnetic fields having differing field directions. One set of fields has a clockwise field orientation while another set of fields has a counter-clockwise field orientation. The radius of the magnet 26 and the dimensions of the pole widths can be varied to achieve the desired magnetic field strength and orientations.

The magnet member 26 has a magnet portion 26a supported on a core or rotor portion 26b. The rotor portion 26b includes a circular body portion 36 having a bore 38 for receiving the shaft 22 and a radially extending arm portion 40 interconnecting the circular body portion 36 and the arcuate body portion 34. Preferably the bore 38 is press-fit over the shaft 22 such that the magnet member 26 and shaft 22 rotate in unison, however other attachment methods could be used.

The arcuate body portion 34 of the magnet member 26 moves in an arc about the pivot axis 24 as a force is applied to the pedal pad 16 with the magnet member 26 moving relative to the non-contact sensing surface 30 to generate the electric control signal. The non-contact sensing surface 30 measures a varying magnetic field generated by the magnet member 26 as the pedal arm 12 pivots between operational positions and generates a linear output voltage proportional to pedal deflection.

As shown in FIGS. 2–5, the pedal assembly 10 includes a resistance assembly 46 that is used to provide a hysteresis effect to reduce operator fatigue. The resistance assembly 46 is intended to provide feedback or "feel" to the operator to replace the feedback normally provided by the mechanical linkage interconnecting the accelerator pedal and the fuel throttle. With a mechanical linkage, the pedal pressure required when advancing the accelerator pedal is greater than that required to maintain a fixed position. This difference is often referred to as the hysteresis effect. This effect is important in maintaining the accelerator pedal 10 in position while driving at a relatively constant speed and it must also be considered in achieving a desired deceleration time. The pressure which must be applied in accelerating is easily borne but if the back pressure of an accelerator spring produced the same effect during the time it was require to retain or maintain speed it would soon become uncomfortable for the operator to maintain a relatively constant speed. The hysteresis effect provides relief. It lessens the load required to maintain a setting of the accelerator yet there is still force to cause reverse pedal action when the foot applied pressure is removed. The resistance assembly 46 provides the "feel" of a mechanical linkage including the desired hysteresis effect to relive operator fatigue.

Figure 4:
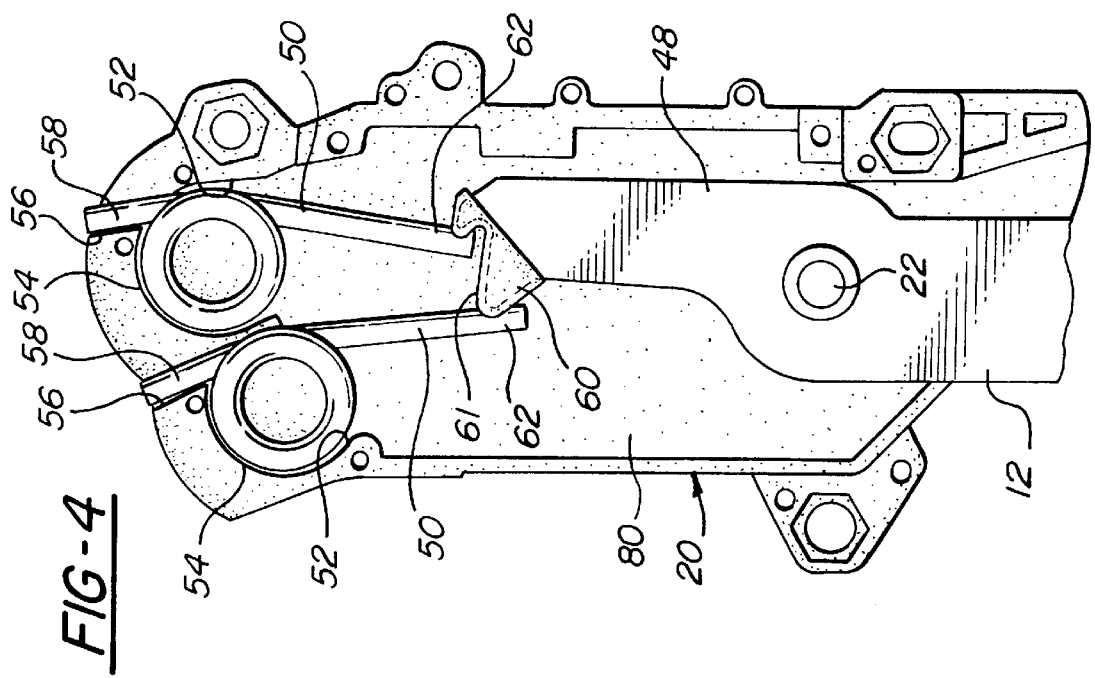
FIG. 4 is a side view, partially broken away, with the cover and dividing portion removed and showing the resistance assembly when the pedal arm is in the rest position.

As shown in FIG. 4, the pedal arm 12 includes an upper portion 48 extending above the pivot axis 24 for interacting with a resilient spring 50 to provide the hysteresis effect. In the preferred embodiment, a pair of springs 50 are use, however any number of springs 50 may be used to create the desired hysteresis effect. The housing 20 includes a recess portion 52 with a curved side wall 54 for receiving the spring 50. The recess 52 has a tangentially extending notch 56 for seating a first end 58 of the spring 50. The upper portion 48 of the pedal arm 12 includes a cam lobe 60 that applies a force to a second end 62 of the spring 50 as the pedal arm 12 pivots about the axis 24. Preferably, the cam lobe includes a cap member 61 with that provides an improved wear face. The spring 50 is forced into frictional contact with the side wall 54 when the pedal arm 12 is pivoted from a rest position (shown in FIG. 5) to an applied position ( shown in FIG. 6) to reduce the spring force of the spring 50 on the pedal arm 12.

As shown in FIG. 2, the pedal assembly 10 includes a cover 64 for attachment to the housing 20 to provide a sealed environment for the magnet member 26 and the non-contact sensing surface 30. The non-contact sensing surface 30 should be free of dirt and other contaminants in order to work efficiently. The cover 64 keeps the dirt from interfering in the operation of the magnet member 26 as it rotates relative to the sensing surface 30. Preferably the housing 20 and cover 64 are light-weight and are made from a nylon or plastic material.

The housing 20 preferably includes a plurality of tabs 66 spaced around a circumferential lip 68 of the housing 20. The tabs 66 are inserted into corresponding openings 70 in the cover 64 and are heat staked to fasten the housing 20 and cover 64 together. It should be understood, however, that other fastening methods known in the art could also be used to connect the housing 20 to the cover 64.

The housing 20 also includes a groove 82 extending around an outer peripheral surface 84. An epoxy sealer is placed applied to the groove 82 and the cover 64 is attached to the housing 20. This provides a sealed environment for the magnet member 26 and sensing surface 30. Other sealing methods known in the art can also be used. O-rings (not shown) are used to seal the pivot shaft 22 within the housing 20 and cover 64.

As shown in FIG. 3, the non-contact sensing surface 30 is electrically connected to output nodes 72. As the magnet member 26 pivots relative to the sensing surface 30 electrical signals are generated and sent to the nodes 72. An electrical connection port 74 is integrally formed to one side of the housing 20. An electrical connector (not shown) is inserted into the port 74 and the electrical signal generated by the interaction of the magnet member 26 with sensing surface 30 is sent to a vehicle control system 76 such as a computer, for example. The signal is then sent to the engine throttle, shown schematically at 78, which is then moved to the desired position. The control signal could also be used to control braking or a clutch mechanism. As discussed above, the electric control signal varies in magnitude as the force is applied to the pedal pad 16 to move the pedal arm 12 from a rest position to an applied position.

As discussed above, the magnet portion 26a is supported on the rotor potion 26b and the non-contact sensor portion 30 is held fixed relative to the rotor portion 26b. The non-contact sensor 30 is preferably formed as a two (2) piece stator 30a, 30b with a plurality of Hall chips 30c positioned between the stator pieces 30a, 30b. The Hall chips 30c are the non-contact sensing surface that generates the electrical control signal for the engine throttle 78.

Together, the magnet member 26 and non-contact sensor 30 act as a Hall Effect sensor. The operation of Hall Effect sensors is well known in the art and will not be discussed in detail. One advantage of the subject inventive pedal assembly 10 is that a self-contained sensor component does not have to be installed into the pedal assembly. The sensing components, i.e., the magnet member 26, stator 30a, 30b, and Hall chips 30c, are instead integrated directly into the housing 20 of the pedal assembly 10. The stator 30a, 30b and Hall chips 30c are attached to an interior face 28 of the housing 20 such that the interior face 28 and stator 30a, 30b are formed as one piece, and the magnet member 26 is fixed for rotation with the pedal pivot shaft 22.

The housing 20 is preferably made from a plastic material and includes a central dividing section 80 that forms the interior face 28 of the housing. The interior face 28 is preferably formed from a similar material however, other materials could be used. The sensing surface 30 is on one side of the dividing section 80 and the resistance assembly 46 is positioned on an opposite side of the dividing section 80. First the resistance assembly 46 is mounted within the housing 20, the dividing section 80 with the sensing surface 30 is installed, the magnet member 26 is mounted on the pivot shaft 22, and then the cover 64 is attached to the housing 20. It should be understood that the inventive pedal assembly can be used with other types of resistance assemblies known in the art. The configuration and orientation of the resistance assembly 46 shown in FIGS. 2–5 is simply a preferred embodiment.

Although the inventive pedal assembly 10 has been described in detail for use in controlling the throttle of the associated vehicle, the inventive pedal assembly 10 may be used to electrically control a wide variety of vehicle functions or accessories.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A pedal assembly (10) for use to generate a control signal for vehicle system, said assembly comprising:
   a housing (20);
   a pedal arm (12) supported for movement relative to said housing (20) and having a first end (14) connected to a pedal pad (16) and a second end (18) pivotally supported on a shaft (22) to define a pivot axis (24); and
   a rotor (26b) having a circular body portion (36) with a bore (38) for receiving said shaft (22) and a radially extending arm portion (40) interconnecting said circular body portion (36) and said arcuate body portion (34),
   a magnet member including a magnet portion (26a) supported on said arcuate body portion (34) for rotational movement with said shaft (22) in response to pivotal movement of said pedal arm (12) about said pivot axis (24);

said housing (20) presenting a non-contact sensing surface (30c) for interacting with said magnet member (26) to generate an electric control signal that varies in magnitude by the extent of angular rotation of said magnet member (26) relative to said non-contact sensing surface (30), said non-contact sensing surface (30c) being positioned adjacent to said magnet member (26) to define a gap (32) having a predetermined width, said non-contact sensing surface (30c) remaining fixed relative to said magnet member (26).

2. An assembly according to claim 1 wherein said sensing surface (30c) is mounted within said housing (20) such that said sensing surface (30c) and housing (20) are formed as one piece.

3. An assembly according to claim 2 wherein said magnet member (26) moves in an arc about said pivot axis (24) as a force is applied to said pedal pad (16) with said magnet member (26) moving relative to said non-contact sensing surface (30c) to generate said electric control signal.

4. An assembly according to claim 1 wherein said non-contact sensing surface (30c) measures a varying magnetic field generated by said magnet member (26) as said pedal arm (12) pivots between operational positions and generates a linear output voltage proportional to pedal deflection.

5. An assembly according to claim 1 wherein said pedal arm (12) includes an upper portion (48) extending above said pivot axis (24) for interacting with a spring (50) to provide a hysteresis effect.

6. An assembly according to claim 5 wherein said housing (20) includes a recess portion (52) with a curved side wall (54) for receiving said spring (50), said recess portion (52) having a tangentially extending notch (56) for seating a first end (58) of said spring (50).

7. An assembly according to claim 5 wherein said upper portion (48) of said pedal arm includes a cam lobe (60) that applies a force to a second end (62) of said spring (50) as said pedal arm (12) pivots about said axis (24) and wherein said spring (50) is forced into frictional contact with said side wall (54) when said pedal arm (12) is pivoted from a rest position to an applied position to reduce the spring force of said spring (50) on said pedal arm (12).

8. An assembly according to claim 1 including a cover (64) for attachment to said housing (20) to enclose said magnet member (26) and said non-contact sensing surface (30) within said housing (20).

9. A pedal assembly (10) for use to generate a control signal for a vehicle system, said assembly comprising:

a pedal arm (12) having a lower end (14) connected to a pedal pad (16) and an upper end (18) pivotally supported on a pivot shaft (22) to define a pivot axis (24);

a housing (20) for supporting said pivot shaft (22) such that said pedal arm (12) is mounted for movement relative to said housing (20) about said pivot axis (24);

a sensor assembly including a magnet member (26) pivotally mounted on said shaft (22) for pivotal movement with said pedal arm (12) about said pivot axis (24) and a non-contact sensing surface (30c) extending across an interior face (28) of said housing (20) for interacting with said magnet member (26) wherein rotational movement of said magnet member (26) is converted to a linear output control signal via said non-contact sensing surface (30);

at least one resilient member (50) mounted within a curved pocket (54) of said housing (20), said resilient member (50) having a first end (58) fixed to said housing (20) and a second end (62) engageable by a camming portion (60) on said upper end (18) of said pedal arm (12) to create a hysteresis effect when said pedal arm (12) is moved from a rest position to an applied position; and a cover (64) connected to said housing (20) for enclosing said sensor assembly within said housing to provide a sealed environment for said magnet member (26) and said non-contact sensing surface (30c).

10. An assembly according to claim 9 wherein said magnet member (26) includes a magnet portion (26a) supported on a rotor (26b) having an arcuate body portion (34) defined by a predetermined arc length, a circular body portion (36) having a bore (38) for receiving said shaft (22), and a radially extending arm portion (40) interconnecting said circular body portion (36) and said arcuate body portion (34).

11. An assembly according to claim 10 wherein said non-contact sensing surface (30c) is positioned adjacent to said magnet portion (26a) to define a gap (32) having a predetermined width, said non-contact sensing surface (30c) remaining fixed relative to said magnet portion (26a) such that at least a minimum gap width between said magnet portion (26a) and said sensing surface (30c) is maintained at all pedal operational positions.

* * * * *